(12) United States Patent
Sjolander et al.

(10) Patent No.: US 7,198,556 B2
(45) Date of Patent: Apr. 3, 2007

(54) GRINDING APPARATUS

(75) Inventors: Robert Sjolander, Burlington (CA); Bjorn Sjolander, Burlington (CA); Bo Thomas Sjolander, Oakville (CA)

(73) Assignee: C.M.E. Blasting & Mining Equipment Ltd., Oakville (CA)

( * ) Notice: Subject to any disclaimer, the term of this patent is extended or adjusted under 35 U.S.C. 154(b) by 0 days.

(21) Appl. No.: 10/332,629

(22) PCT Filed: Jul. 10, 2001

(86) PCT No.: PCT/CA01/00991

§ 371 (c)(1),
(2), (4) Date: May 15, 2003

(87) PCT Pub. No.: WO02/04169

PCT Pub. Date: Jan. 17, 2002

(65) Prior Publication Data

US 2004/0014406 A1 Jan. 22, 2004

(30) Foreign Application Priority Data

Jul. 10, 2000 (CA) .................................... 2313685
Mar. 30, 2001 (CA) .................................... 2342481

(51) Int. Cl.
*B24B 7/00* (2006.01)
*B24B 41/00* (2006.01)

(52) U.S. Cl. ...................................... 451/177; 451/342

(58) Field of Classification Search ................ 451/177, 451/139, 156, 236, 280, 48, 342, 241
See application file for complete search history.

(56) References Cited

U.S. PATENT DOCUMENTS

| | | | |
|---|---|---|---|
| 2,651,888 A * | 9/1953 | Comstock | 451/139 |
| 3,641,709 A * | 2/1972 | Gazuit | 451/139 |
| 3,888,049 A * | 6/1975 | MacSween | 451/280 |
| 5,070,654 A | 12/1991 | Manqvist et al. | |
| 5,090,160 A | 2/1992 | Paquette | |
| 5,193,312 A | 3/1993 | Gudmundsson et al. | |
| 5,369,843 A | 12/1994 | Yu | |
| 6,645,047 B1 * | 11/2003 | Liskow | 451/11 |

FOREIGN PATENT DOCUMENTS

| | | |
|---|---|---|
| EP | 0365497 | 4/1990 |
| GB | 2 193 456 A | 2/1988 |
| SE | 428541 | 7/1983 |
| WO | WO0000325 | 1/2000 |
| WO | WO 2004080651 A1 * | 9/2004 |

* cited by examiner

*Primary Examiner*—Hadi Shakeri
(74) *Attorney, Agent, or Firm*—Volpe & Koenig, P.C.

(57) ABSTRACT

A grinding apparatus for grinding the hard metal inserts or working tips of drill bits (percussive or rotary), tunnel boring machine cutters (TMB) and raised bore machine cutters (RBM), said grinding apparatus having means for holding one or more bits to be ground and a grinding machine carried by an arm or lever system that permits movement of the grinding machine relative to the longitudinal axis of the button of the bit to be ground wherein means are provided to assist with aligning the grinding machine with the longitudinal axis of the button to be ground.

24 Claims, 20 Drawing Sheets

GRINDING APPARATUS

BACKGROUND OF THE INVENTION

The present invention relates to improvements in apparatus for grinding the hard metal inserts or working tips of drill bits (percussive or rotary), tunnel boring machine cutters (TBM) and raised bore machine cutters (RBM) and more specifically, but not exclusively, for grinding the tungsten carbide cutting teeth or buttons of a drill bit or cutter.

In drilling operations the cutting teeth (buttons) on the drill bits or cutters become flattened (worn) after continued use. Regular maintenance of the drill bit or cutter by regrinding (sharpening) the buttons to restore them to substantially their original profile enhances the bit/cutter life, speeds up drilling and reduces drilling costs. Regrinding should be undertaken when the wear of the buttons is optimally one third to a maximum of one-half the button diameter.

Manufacturers have developed a range of different manual and semi-automatic grinding machines including hand held grinders, single arm and double arm self centering machines for setting up two or more bits to be ground, mobile machines for grinding on the road or in a workshop and grinders designed specifically for mounting on drill rigs, service vehicles or set up in the shop. The present invention is particularly applicable to mobile grinding apparatus of the type described in U.S. Pat. No. 5,193,312 and semi-automatic grinding machines as described in U.S. Pat. No. 5,070,654.

These types of machines utilize a grinding cup having the desired profile rotated at high speed to grind the carbide button and the face of the bit/cutter surrounding the base of the button to restore the button to substantially its original profile for effective drilling. When grinding buttons, the centering aspects of the grinding machine tend to center the grinding machine over the highest point on the button. On buttons where wear is uneven, typically gauge buttons, this may result in regrinding the button off center from its longitudinal axis.

The conventional grinder designs switch between grinding pressure and balance pressure to achieve the desired effect. This, for example, does not allow for a grinding pressure equal to zero. In conventional grinder designs, the minimum grinding pressure is equivalent to the weight of the arm or lever section and the components attached to it. This may, for example, result in grinding pressure that is too great in relation to what is optimum for the size, type and profile of the button being sharpened.

The gauge buttons are mounted in the bit at an angle relative to the face of the bit. In order to properly regrind a worn gauge button the bit must be tilted to correspond to the angle at which the gauge buttons are mounted in the bit. In order to regrind all the buttons on the bit, the operator must continually, tilt and rotate the bit as he proceeds from button to button and/or bit to bit.

SUMMARY OF THE INVENTION

It is an object of the present invention to provide means to help align, and optionally lock, the grinding machine with the longitudinal axis of the button to be ground.

It is a further object of the present invention to provide a biased side load to the grinding machine to help align the grinding machine with the longitudinal axis of the button to be ground.

It is a further object of the present invention to provide a balance pressure to the arm section which controls the movement of the grinding machine along the longitudinal axis of the bit or button when not in use and grinding pressure when in use.

It is a further object of the present invention to provide a controlled combination of balance pressure and grinding pressure to the grinding machine, whenever necessary.

It is a further object of the present invention to minimize operator set up and movement of the bit during regrinding.

Accordingly the present invention provides a grinding apparatus for grinding the hard metal inserts or working tips of drill bits (percussive or rotary), tunnel boring machine cutters (TBM) and raised bore machine cutters (RBM). The grinding apparatus consists of a means for holding one or more bits to be ground. In the preferred embodiment the means to hold the bit(s) is a table mounted in or on a frame, box or stand and is provided with one or more apertures to hold one or more bits to be ground. A grinding machine is carried by an arm or lever system that permits movement of the grinding machine relative to the bit or button to be ground. This is normally horizontal and vertical movement. Means are provided to help align the grinding machine with the longitudinal axis of the button to be ground. In one embodiment the means to help align the grinding machine with the longitudinal axis of the button provides a biased side load, optionally adjustable, to the grinding machine.

Another aspect of the present invention relates to means to provide a balance pressure to the arm or lever section that controls the movement of the grinding machine in the direction of the longitudinal axis of the button or bit when not in use and grinding pressure when in use.

Another aspect of the present invention relates to means to provide a controlled combination of balance pressure and grinding pressure to the grinding machine. This allows for a greater range of grinding pressure, or reduction of minimum grinding pressure by countering the combined weight of the arm or lever section and all other components contributing to feed during grinding.

Another aspect of the present invention relates to a grinding apparatus for grinding the hard metal inserts or working tips of drill bits (percussive or rotary), tunnel boring machine cutters (TBM) and raised bore machine cutters (RBM). The grinding apparatus includes a means for holding one or more bits to be ground. The means for holding the bit(s) is tiltably or pivotably mounted in or on a frame, box or stand with means to control the tilting/pivoting action. The means for holding the bit(s) is preferably a table provided with one or more apertures to hold one or more bits to be ground. A grinding machine is carried by an arm or lever system that permits horizontal and vertical movement of the grinding machine relative to the bit or button to be ground.

A further aspect of the present invention relates, where the grinding machine uses a hex drive configuration as described in U.S. Pat. Nos. 5,639,273 and 5,727,994, to a means to easily align and attach the grinding cup and detach the grinding cup after use.

Further features of the invention will be described or will become apparent in the course of the following detailed description.

BRIEF DESCRIPTION OF THE DRAWINGS

In order that the invention may be more clearly understood, the preferred embodiments thereof will now be described in detail by way of example, with reference to the accompanying drawings, in which.

DETAILED DESCRIPTION OF PREFERRED EMBODIMENTS

Figure 1:
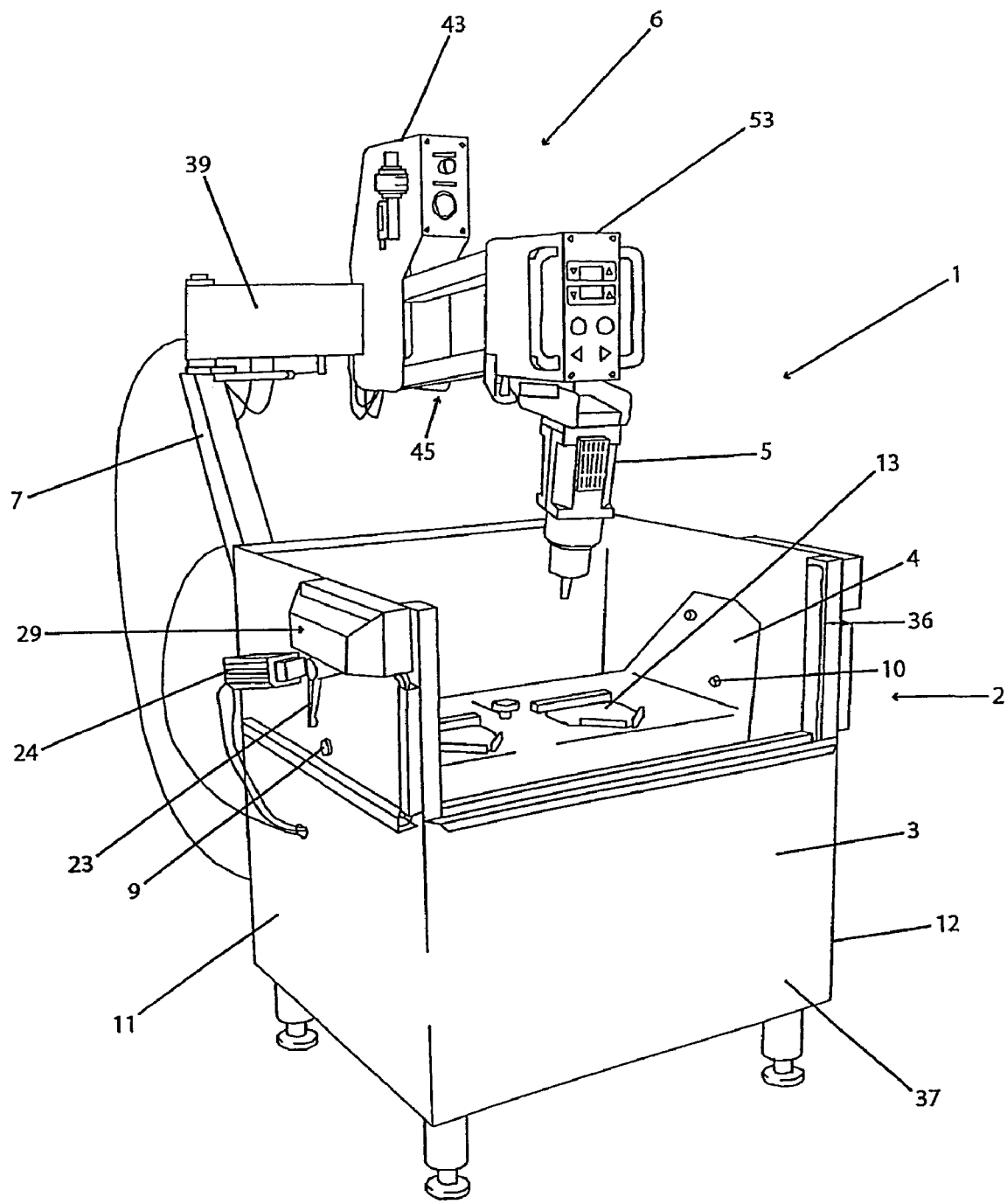
FIG. 1 is a perspective view of one embodiment of an improved grinding apparatus according to the present invention having a grinding machine carried for vertical and horizontal adjustment by an arm or lever system journaled on a stand and with a tiltable table, pivotally mounted in a box, for holding the bit(s) to be ground.
Figure 2:
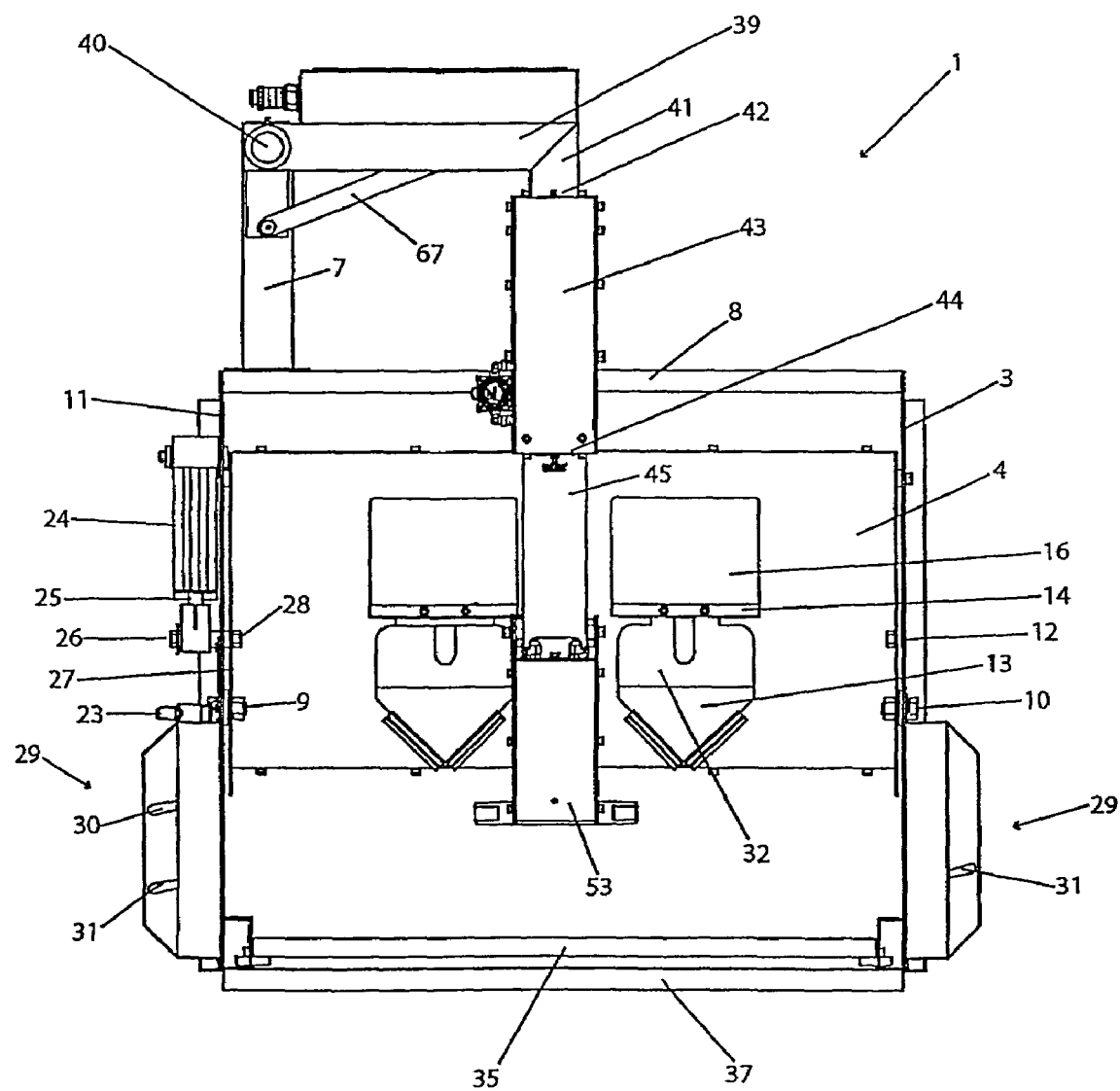
FIG. 2 is a top plan view of the box and tilting table of the grinding apparatus of FIG. 1.
Figure 3:
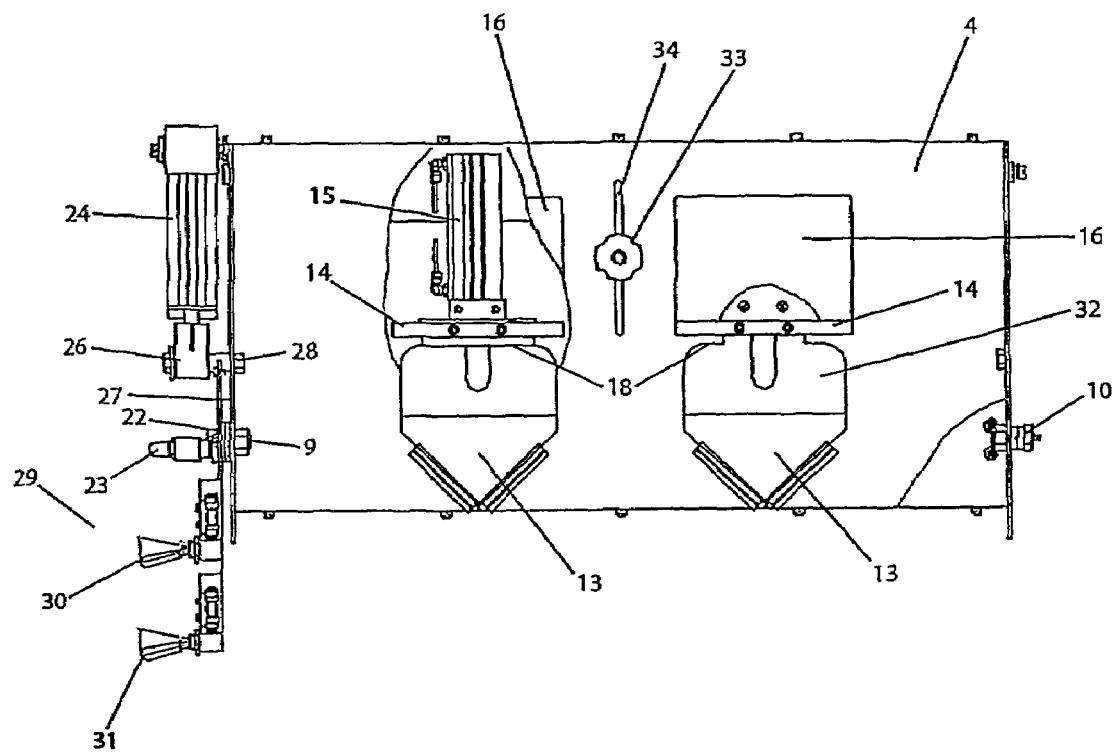
FIG. 3 is a top plan view, partially cut away, of the apertures for holding the bits in the table of FIG. 2.

With reference to the FIGS. 1 to 11 one embodiment of a grinding apparatus according to the present invention is generally indicated at 1. The grinding apparatus 1 includes means for holding one or more bits to be ground generally indicated at 2. In this embodiment the means for holding the bit(s) consists of an open box 3 having a table 4 mounted within the box. A grinding machine 5 is carried by an arm or lever system, generally indicated at 6, journaled on a stand 7 attached to the rear 8 of box 3. A compressed air feed is provided to operate various aspects of the grinding apparatus as discussed in detail below.

Figure 4:
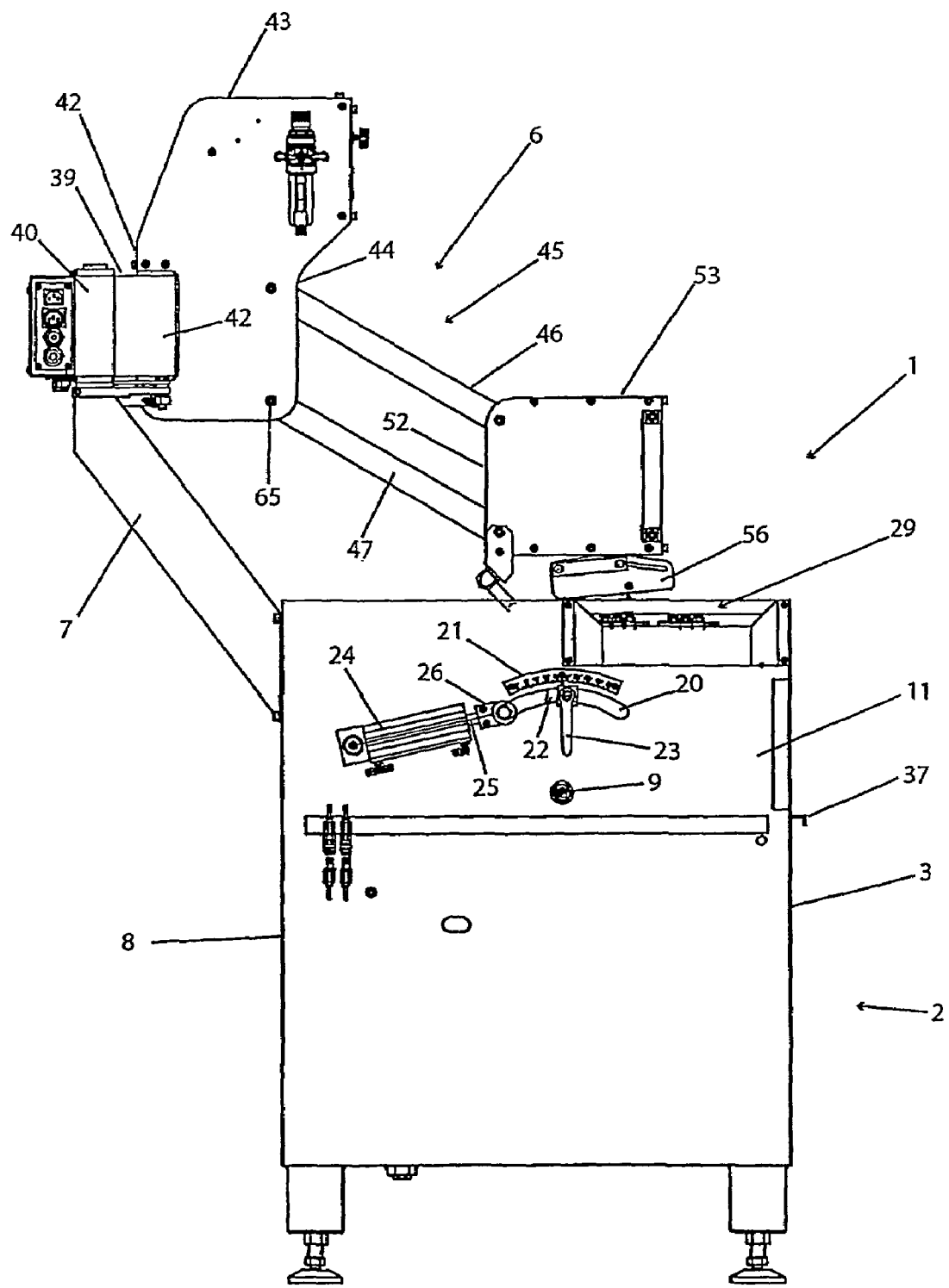
FIG. 4 is a plan view of the left side of the grinding apparatus of FIG. 1 showing the means of tilting the table.
Figure 5:
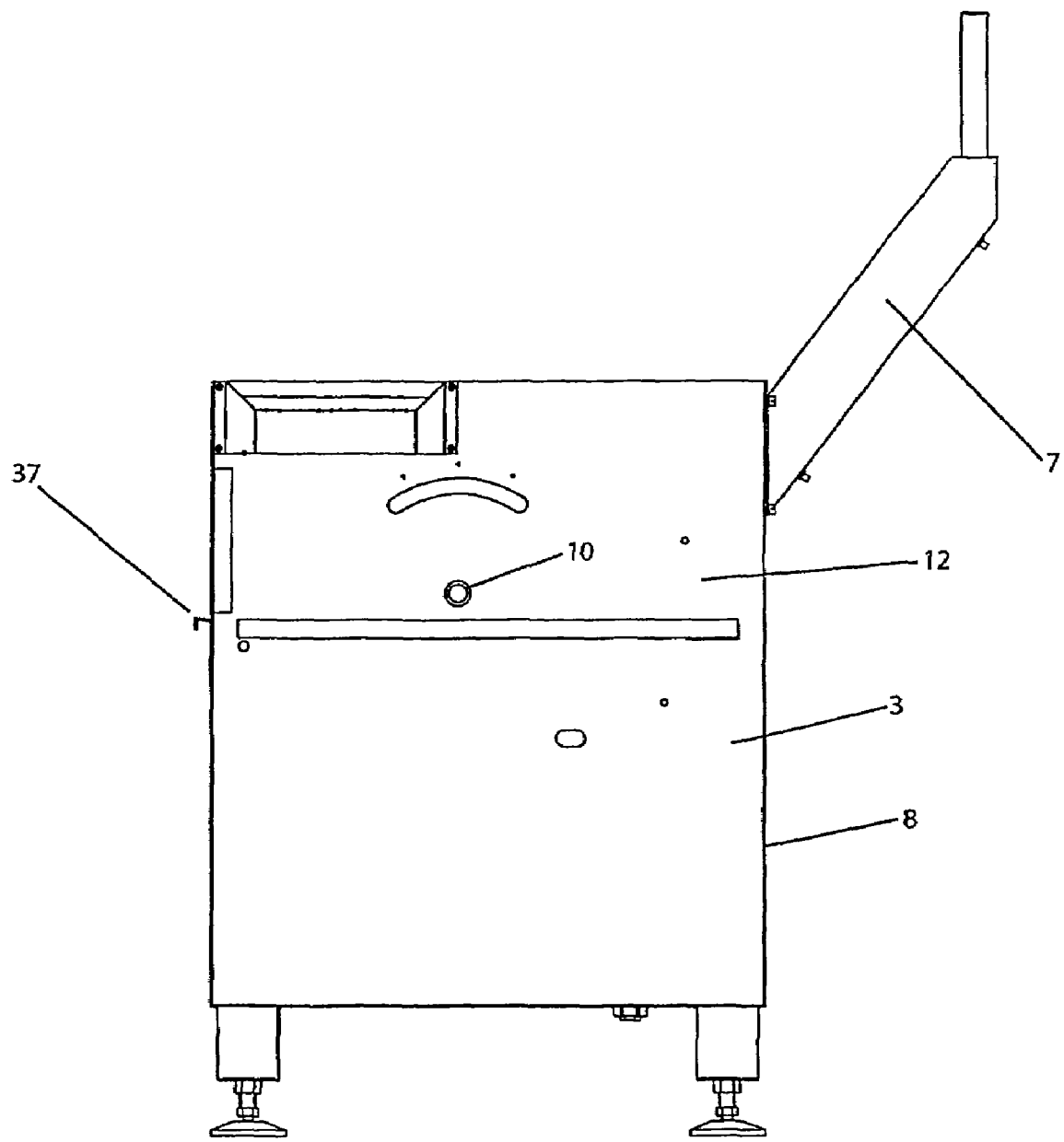
FIG. 5 is a plan view of the right side of the grinding apparatus of FIG. 1.
Figure 6:
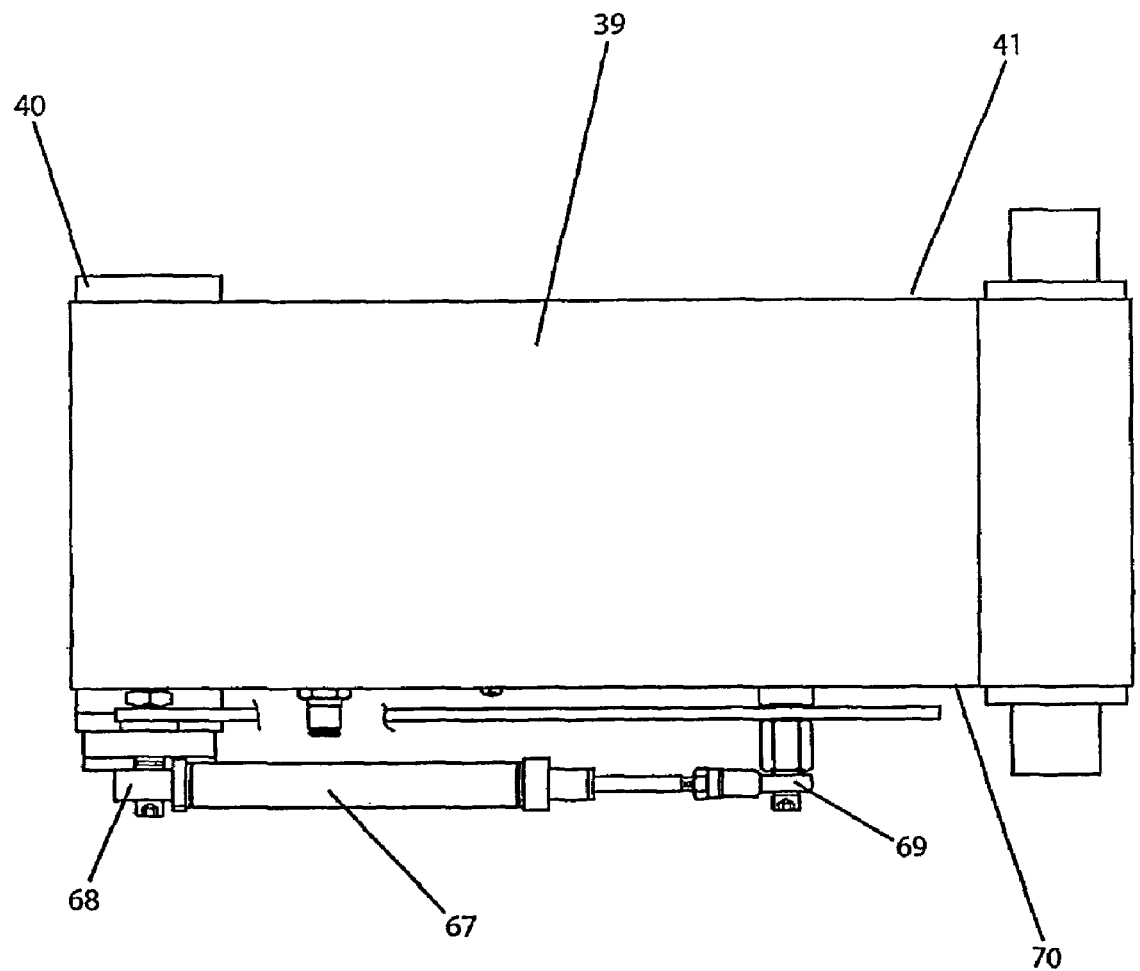
FIG. 6 is a plan view of the left side of a first arm section of the arm system of FIG. 1.

In order to minimize operator set up and movement of the bit during regrinding, table 4 is tiltably mounted within box 3 at pivot points 9,10 on each side 11, 12 of the box 3 (see FIGS. 4 and 5). The table 4 is provided with one or more apertures 13 to hold one or more bits to be ground. When a bit(s) (not shown) is positioned in aperture 13 the bit is held in place by pressure plate 14 controlled by a locking cylinder 15. A shield 16 is attached to and moves with the pressure plate 14 and fully covers the opening between the rear of pressure plate 14 and back 17 of aperture 13. The shield 16 protects the piston rod of the cylinder 15 and prevents accidental pinching of fingers, etc. when the locking cylinder and pressure plate are retracted. The locking cylinder 15 can be depressurized and backed off slightly to rotate the bit (to the next button to be ground) within the aperture 13 without full retraction of the locking cylinder 15 and pressure plate 14 attached to it.

If the button to be ground is a gauge button, it is typically mounted in the bit at an angle relative to the face of the bit. The grinding machine 5, in order to properly regrind a worn button, should be aligned with the longitudinal axis of the button. Accordingly to regrind the gauge buttons, in the embodiment shown, table 4 is tilted to correspond to the angle at which the gauge buttons are mounted in the bit. Alternatively, the grinding apparatus could have, for example, a tilting feature or positioning feature allowing the grinding machine to be aligned with, and provide balance and grinding pressure along, the longitudinal axis of the button, without tilting the bit or button.

The means of tilting table 4 is best illustrated with reference to FIG. 4. An arced slot 20 is provided in the side 11 of box 3. A similar slot is provided in the other side 12 of box 3 so the means for tilting the table can be mounted on either side of the box. A scale 21 is preferably provided to indicate the angle at which the table 4 will be tilted. A stop 22 is positioned within the slot 20 at the desired angle and locked in place by lever 23. Once set for a particular bit type, the angle is fixed and doesn't have to be reset for each bit or button to be reground. A cylinder 24 is provided on the side 11 of the box 3 and the end 26 of the cylinder rod 25 is connected to the side 27 of table 4 at point 28. When air is fed to cylinder 24, extension of the rod 25 will tilt table 4 until further extension is prevented by stop 22. As shown in FIG. 4, controls, generally indicated at 29, for tilting the table and locking the bit(s) in place are provided at the side 11 of the box 3. One switch 30 controls the cylinder 24 for tilting the table 4 and a second switch 31 controls the locking cylinder 15 and pressure plate 14. Switches 30, 31 to control the locking cylinder 15 and pressure plate 14 of the second aperture 13 and the tilting of the table may be provided on the other side 12 of box 3. Flow controls are provided to regulate the speed of movement of the table and the pressure plate. The tilting means can be mounted on either side of the box so that two boxes may be mounted side by side, while leaving the tilting means easily accessible Large down the hole bits to be reground typically have a relatively long shaft that fits through aperture(s) 13. In order to regrind smaller bits a floor plate 32 that can be pivoted (slid) in and out of position under aperture 13 is provided. Knob 33 and slot 34 in table 4 control the location of the floor plate 32. Adapters (not shown) for holding multiple small sized bits can be inserted into aperture 13. An air-actuated adapter having a pair of adjustable outer plates to accommodate different sizes of bits and air actuated locking plates is preferred. Use of the adapters eliminates repetitive set up time for the operator.

A splash-guard 35 is provided at the front 37 of the box 3 that can be raised and lowered along a slot 36 on each side of the front 37 edge of box 3. A counter balancing spring assists in the ease of operation of splashguard 35. The splashguard 35 can be set and retained at different heights as desired.

The arm system 6 for carrying and positioning grinding machine 5 as noted previously is journaled onto stand 7. With reference to FIGS. 1, 2, 4, and 6–9, the arm system 6 consists a first arm section 39 having one end 40 journaled to stand 7. The other end 41 of the first arm section 39 is journaled to the backside 42 of a first control box 43. The first arm section 39 controls the horizontal location of the grinding machine relative to the bit to be reground. To the front side 44 of control box 43 is pivotally mounted a second arm section generally indicated at 45. The second arm section 45 consists of a pair of parallel arms 46, 47 with one end 48,49 of each arm 46,47 pivotally mounted to the front side 44 of the first control box 43. The other end 50,51 of each arm 46, 47 is pivotally connected to the backside 52 of a second control box 53. The second arm section 45 controls the vertical movement of the grinding machine up and down.

Within the second control box 53 (FIG. 11), is a rotation motor 54 and bearing arrangement 55 for providing an orbital rotation to grinding machine 5. The grinding machine 5 is attached to control box 53 by means of plates 56. The grinding machine 5 has an electric motor in the embodiment shown but can also utilize an air or hydraulic motor. Each of the plates 56 is provided with an acruate slot 57. The angle of attachment of the grinding machine 5 relative to control box 53 can be adjusted by means of slots 57 and locking levers 58. By having the grinding machine slightly off vertical, nipple formation on the button being reground is minimized and uneven wear on the grinding cup avoided.

A circuit board 60 is provided within the second control box 53, said circuit board 60 containing the control system for the grinding apparatus including controls and microprocessor to control grinding time on each button and grinding pressure. In the embodiment shown pressure controls 61 are provided with digital read outs on the front 62 of the second control box 53 to permit the operator to set, or increase or decrease grinding time and grinding pressure. The microprocessor can be used to provide other functions either manual or automatic. For example, the microprocessor, in the case of an electric motor, can monitor the amperage being used and if it reaches a preset limit automatically decrease the grinding pressure to prevent motor burn out. The microprocessor can also control the flow of coolant to the face of the button during grinding.

Within the first control box 43 (FIG. 9), is means to provide a balance pressure, generally indicated at 63, to the arm or lever section that controls the movement of the grinding machine in the direction of the longitudinal axis of the button or bit when not in use and grinding pressure when in use. In the embodiment shown, the means to provide a balance pressure 63 to the arm or lever section that controls the vertical movement of the grinding machine is a cylinder 64 connected to an end 49 of the lower arm 47 of the second arm section 45. The end 49 of lower arm 47 extends out from the pivot point 65 at which the lower arm 47 is connected to the first control box 43. Cylinder 64 provides a balance pressure to the second arm section when the grinding machine is not in use and grinding pressure when in use. The grinding pressure can be adjusted. In addition, by applying a controlled balance pressure while in zero grinding pressure mode, a lesser grinding pressure can be achieved than that provided by gravity; effectively increasing the available range of grinding pressure.

Figure 7:
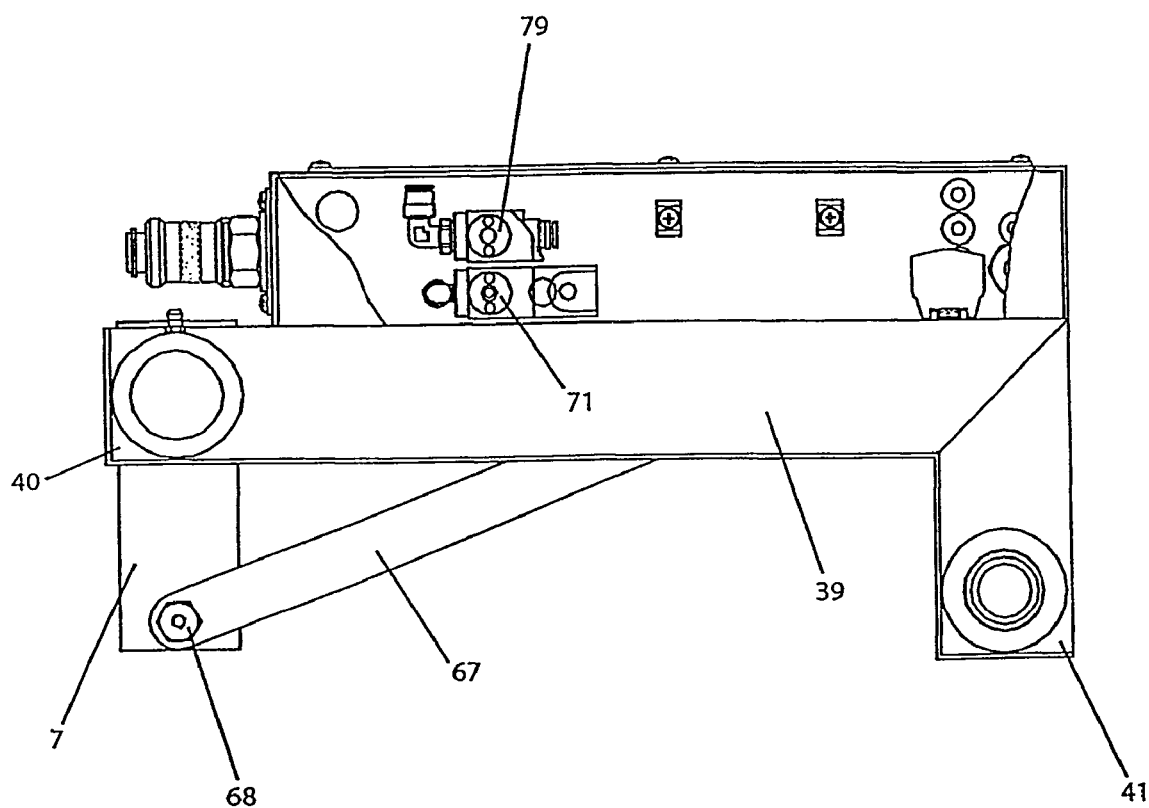
FIG. 7 is a top plan view, partly broken away, of the first arm section of FIG. 6.
Figure 8:
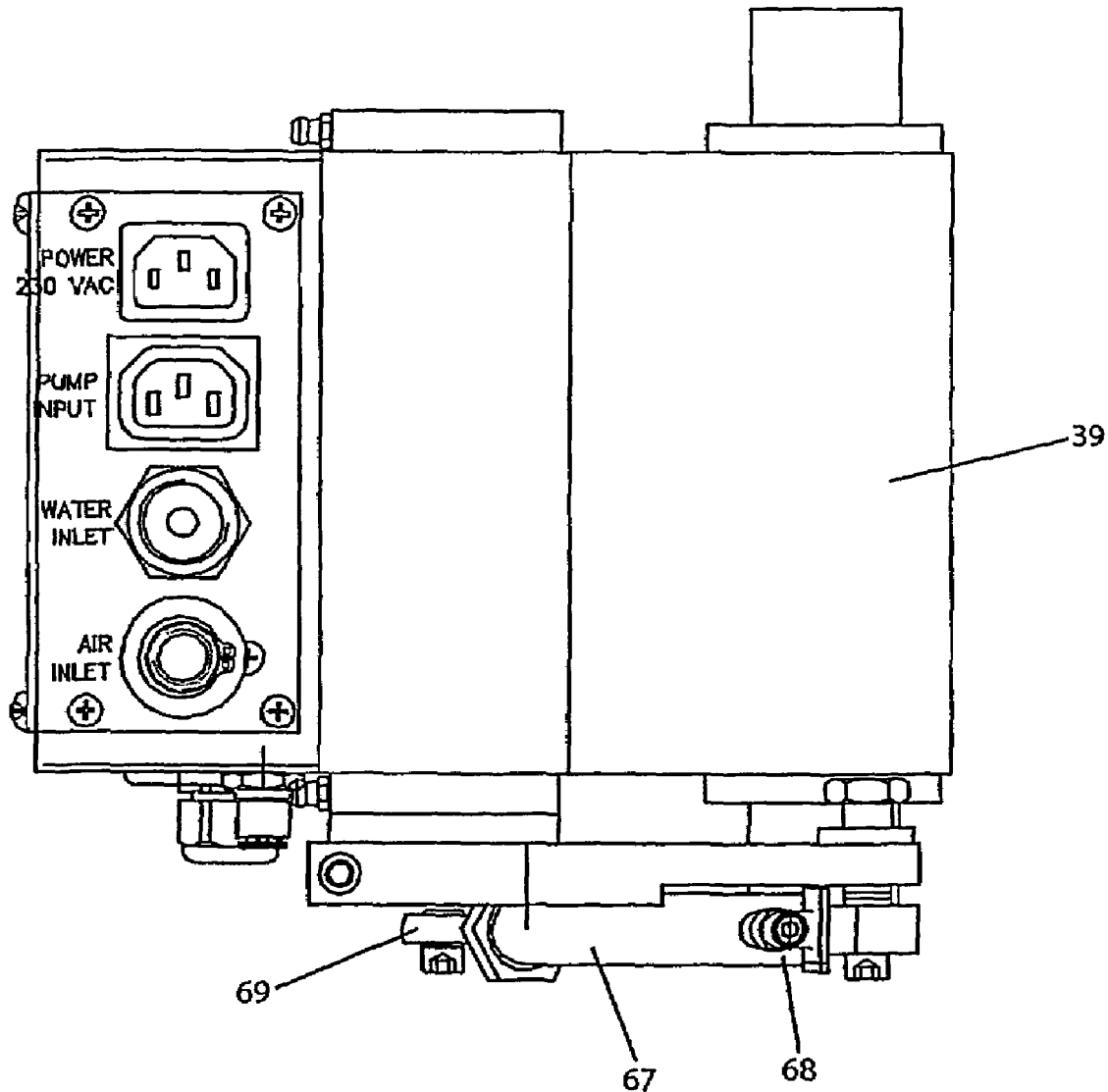
FIG. 8 is a close-up plan view of one end of the first arm section of FIG. 6.
Figure 9:
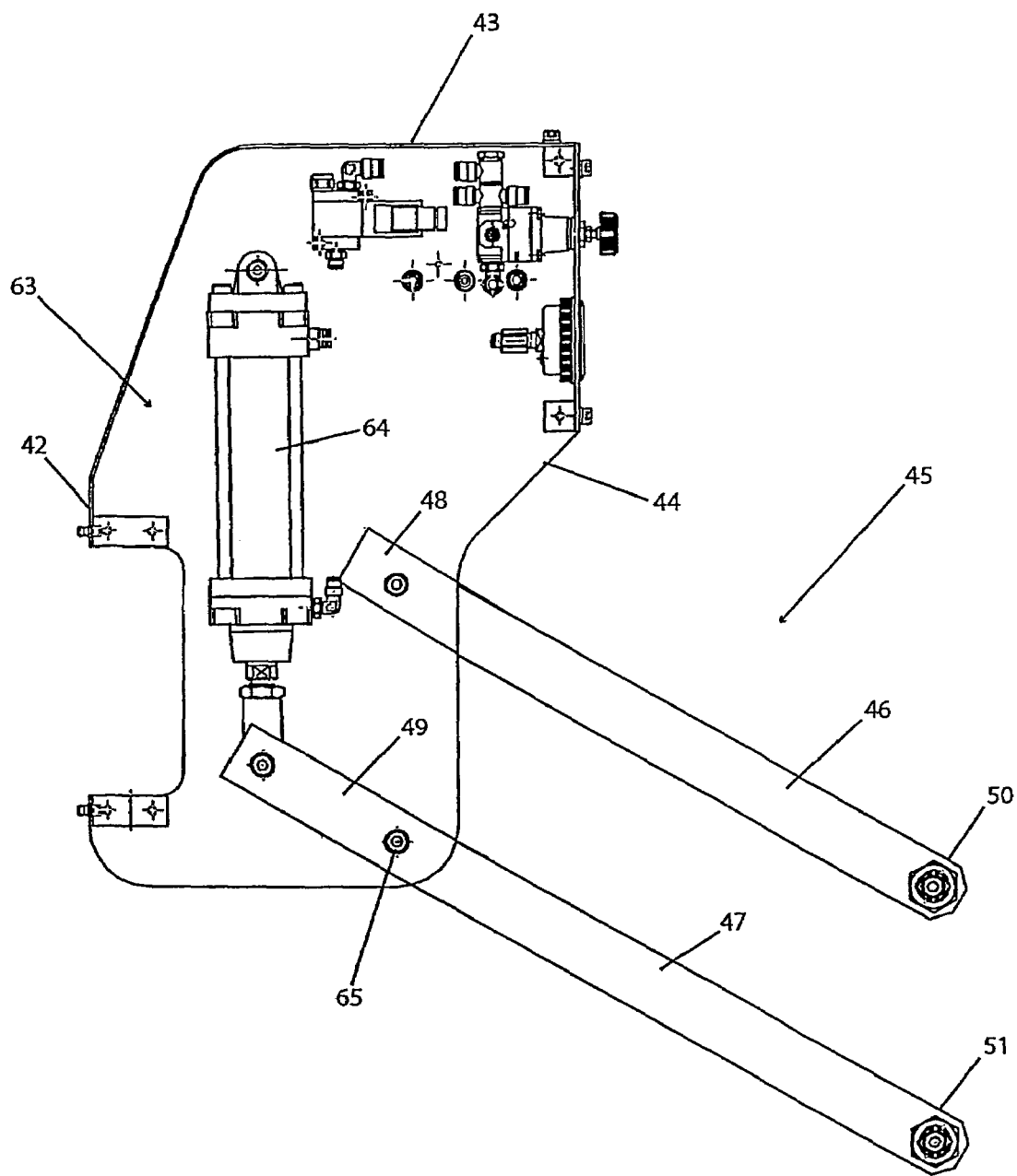
FIG. 9 is a side view in cross section of a first control box and second arm section for setting the balance pressure and feed pressure for the grinding machine of FIG. 1.

When grinding buttons the self-centering aspects of the grinding machine tend to center the grinding machine over the highest point on the button. On buttons where wear is uneven, typically gauge buttons, this may result in regrinding the button off center from its vertical axis. One aspect of the present invention provides means 66 to help align the grinding machine with the longitudinal axis of the button to be ground. In the embodiment shown the means 66 to help align the grinding machine with the longitudinal axis of the button consists of, a cylinder 67 (FIG. 6) having one end 68 connected to stand 7 and the other end 69 connected to the bottom 70 of the first arm section 39. The cylinder 67 provides a side load to grinding machine 5 to help align the grinding machine with the longitudinal axis of the button. In the embodiment shown, the cylinder 67 is automatically activated when the table 4 is tilted by the pilot feed from cylinder 24 through valve 71 (FIG. 7). Valve 79 controls the water flow. The side load biases the grinding machine to grind more on either the outside or the inside of the gauge buttons as required thereby tending to shift the grinding machine over the true center of the button. The means to help align the grinding machine with the longitudinal axis of the button to be ground can alternatively include a locking system to lock the arm in place to prevent movement in a direction normal to the longitudinal axis of the button while permitting movement in the axial direction. Suitable side load can also be provided by means other than by cylinder 67 such as counterweights etc.

While typical grinding apparatus are aligned so that the longitudinal axis of the bit is generally vertical during grinding, in the case of very large bits, or in drilling equipment where bits or cutters are mounted in a clustered pattern, grinding may be done with the bit aligned horizontally or some other suitable angle. The present invention is equally applicable to this situation. In this situation the grinding machine may be carried on an arm or lever system and the grinding pressure applied in a horizontal or other suitable direction.

Figure 10:
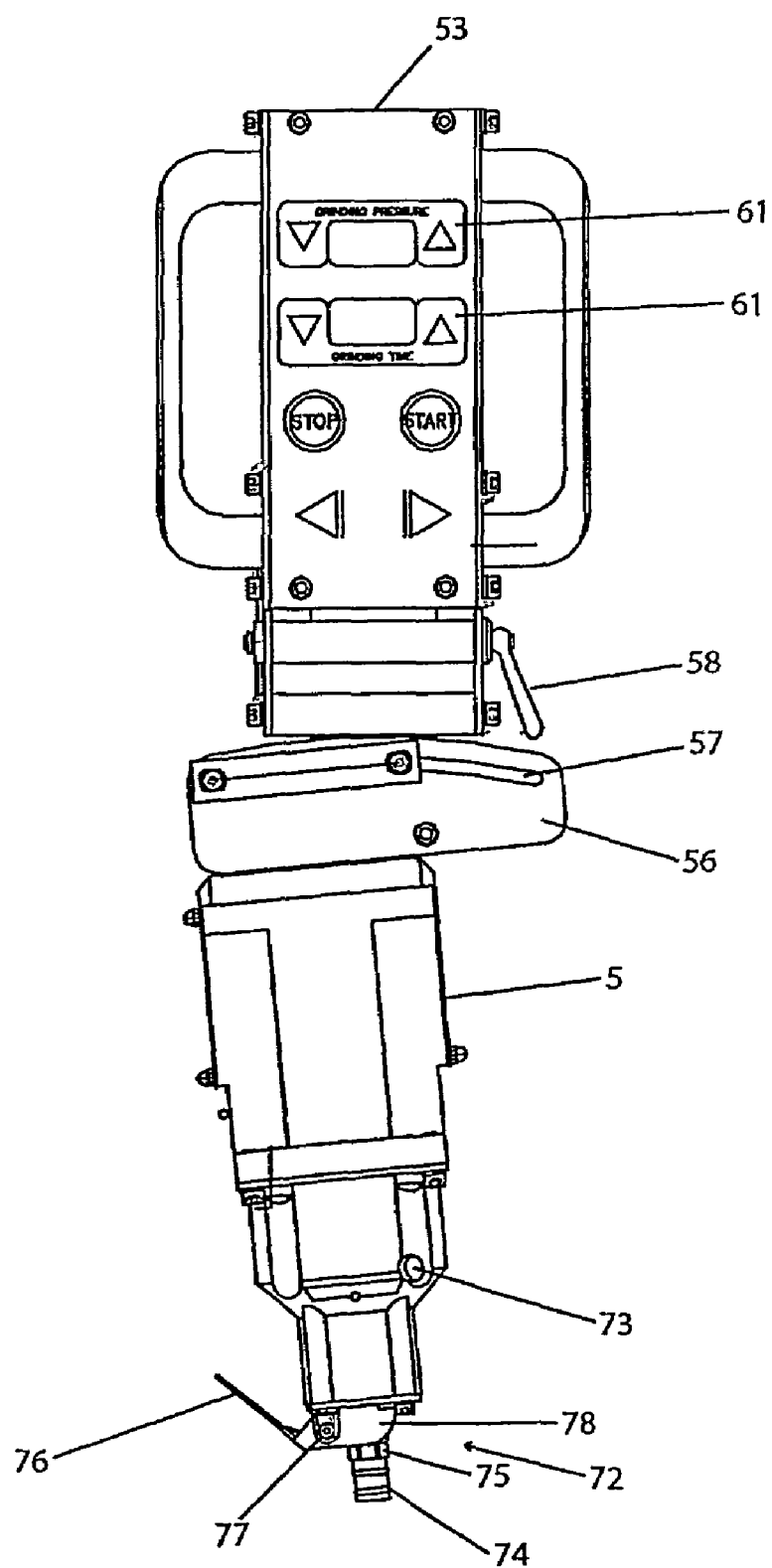
FIG. 10 is a front plan view of the grinding machine and second control box of the arm system of FIG. 1.
Figure 11:
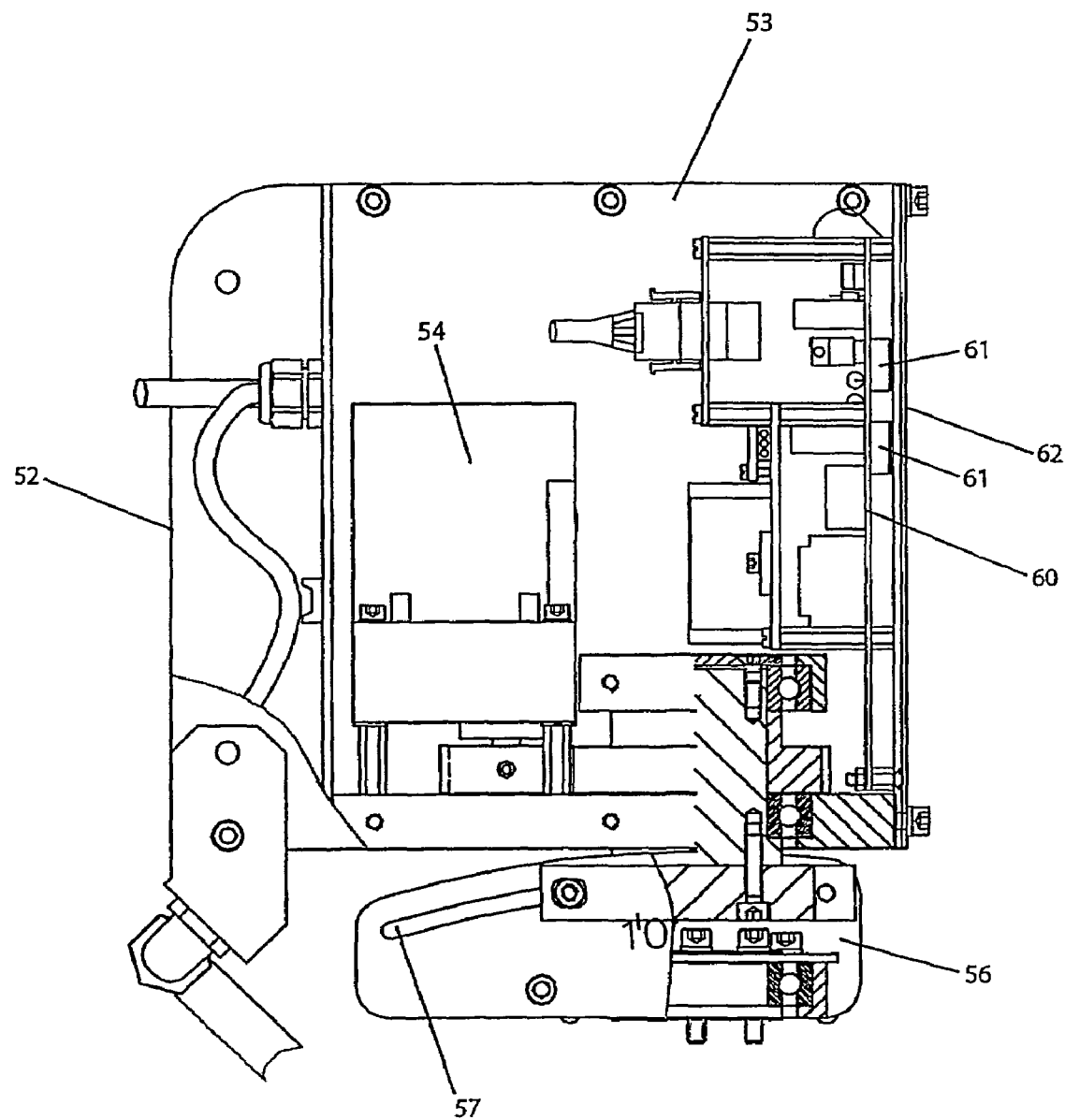
FIG. 11 is an enlarged side view, partially in cross section, of the second control box of FIG. 10.

As best illustrated in FIG. 10, the grinding machine illustrated utilizes a hex drive system of the type described in U.S. Pat. Nos. 5,639,273 and 5,727,994. In order to make the operation of the apparatus operator friendly, means 72 are provided to easily align and attach the grinding cup and detach the grinding cup after use. A spring-loaded button 73 when depressed will fit into a slot in the rotor 74 and prevent it from rotating. This enables the operator to align the hex drive section of the grinding cup with the drive section 75 of the rotor 74 and then push the grinding cup on. To remove the grinding cup after use the operator presses lever 76 towards the grinding machine. The lever 76 pivots around point 77 and the extending arms 78 push the grinding cup away from the drive section of the rotor facilitating removal of the grinding cup from the grinding machine.

With reference to FIGS. 12 to 20 a second embodiment of an improved grinding apparatus according to the present invention is generally indicated at 100. While the present invention is applicable to all grinding apparatus having a grinding machine carried for vertical and horizontal adjustment by an arm or lever system journaled on a stand or frame and preferably with a tiltable table for holding the bit to be ground, the grinding apparatus shown is of the type intended to be mounted on drill rigs, service vehicles or set up in the shop, optionally installed inside a cabinet enclosure.

The grinding apparatus 100 includes means 101 for holding one or more bits to be ground. In this embodiment the means 101 for holding the bit(s) consists of a frame 102 supporting a table 103. The frame 102, of the illustrated embodiment, consists of a generally rectangular box 104 having a back panel 105, left and right side walls 106, 107 normal to said back panel, two extending support arms 108, 109, a top plate 110, bottom plate 111 and hinged cover 112.

A grinding machine 113 is carried by an arm or lever system, generally indicated at 114, journaled on a cylinder rod 115 of cylinder 116 attached to the frame 102. A compressed air connection is provided to operate various aspects of the grinding apparatus as discussed in detail below.

Figure 12:
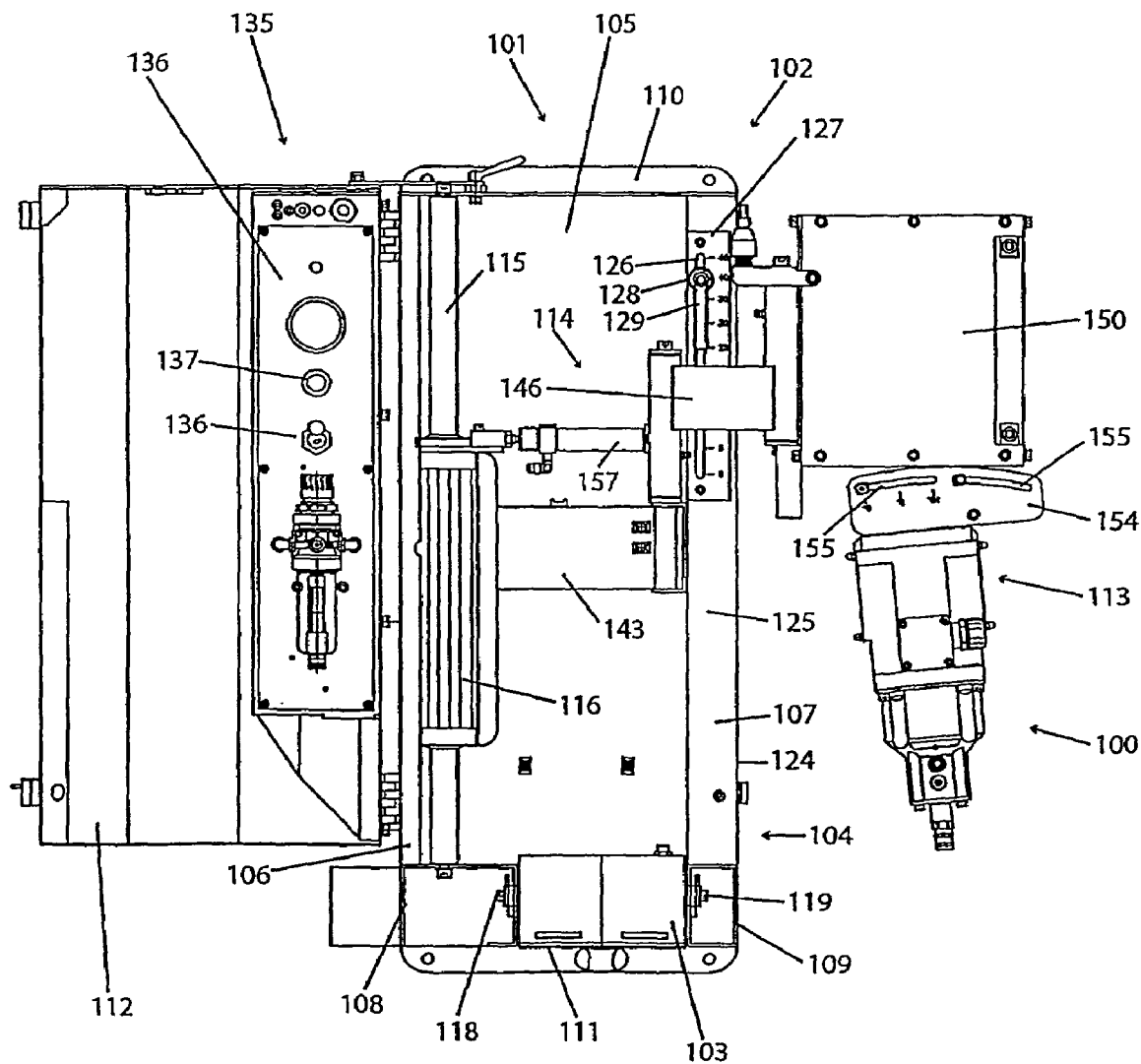
FIG. 12 is a front plan view of another embodiment of an improved grinding apparatus according to the present invention having a grinding machine carried for vertical and horizontal adjustment by an arm or lever system journaled on a stand or frame and with a tiltable table for holding the bit(s) to be ground.
Figure 13:
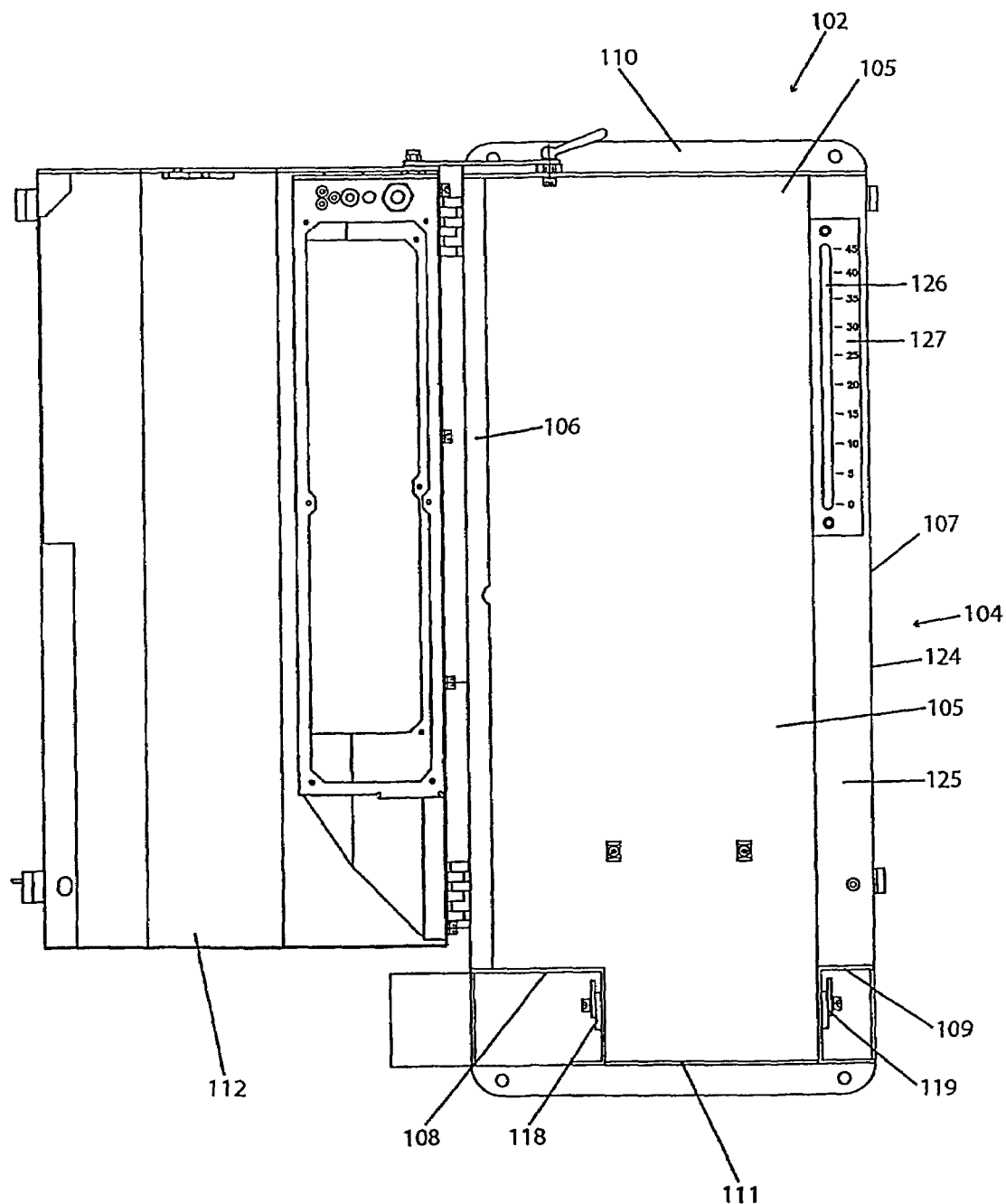
FIG. 13 is a front plan view of the frame for the grinding apparatus of FIG. 12.
Figure 14:
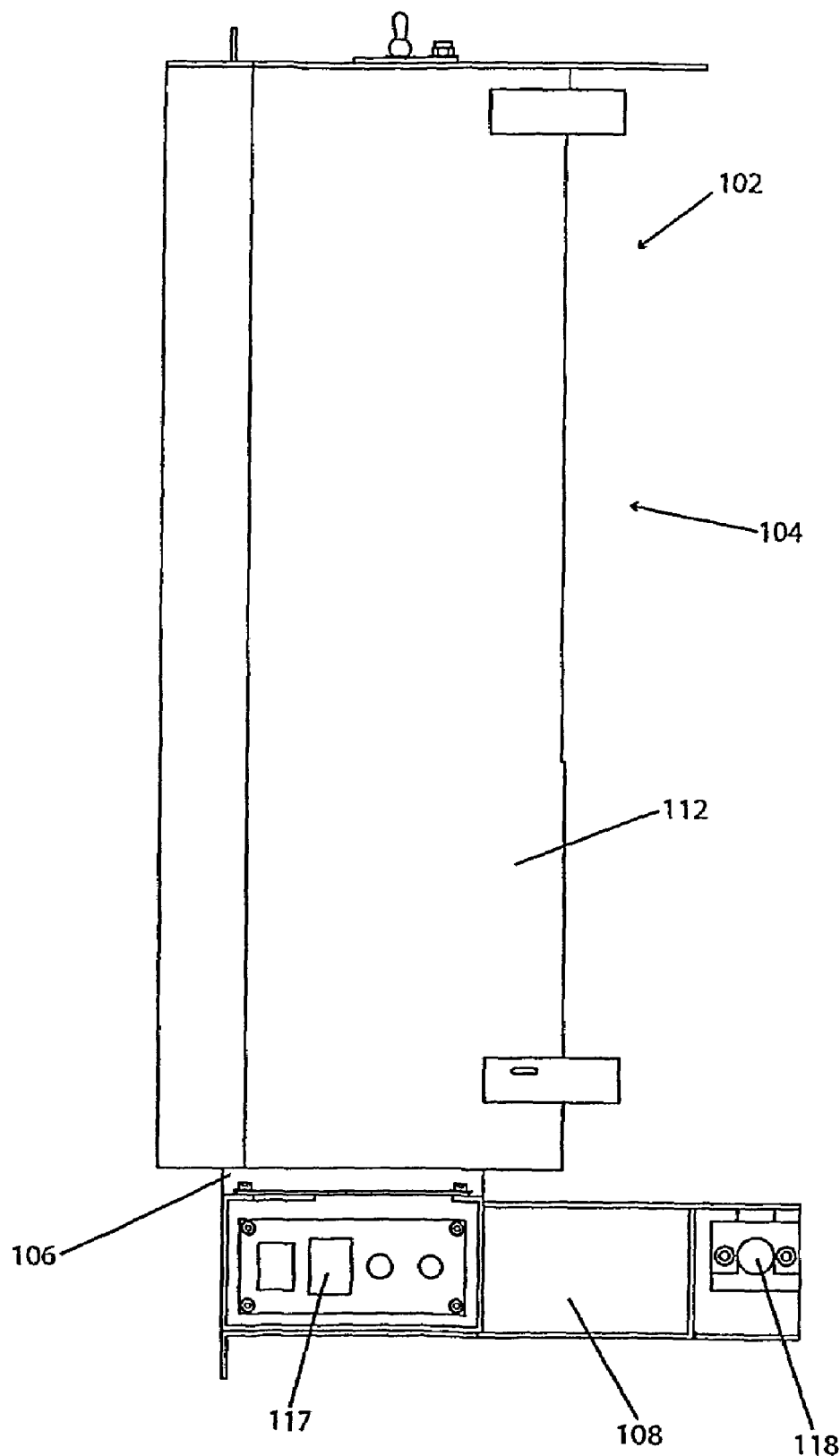
FIG. 14 is a left side plan view of the frame of FIG. 12.
Figure 15:
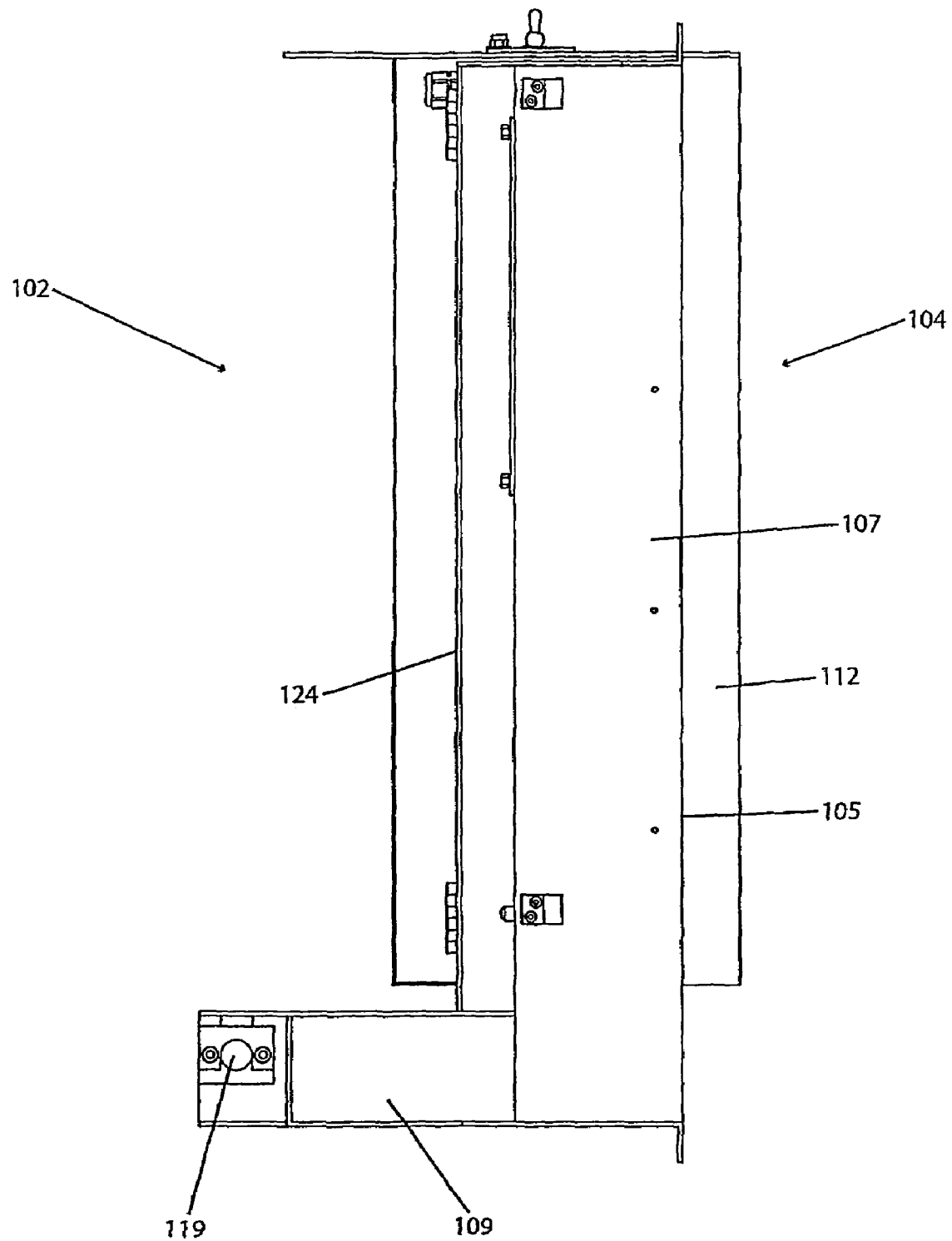
FIG. 15 is a right side view of the frame of FIG. 13.
Figure 18:
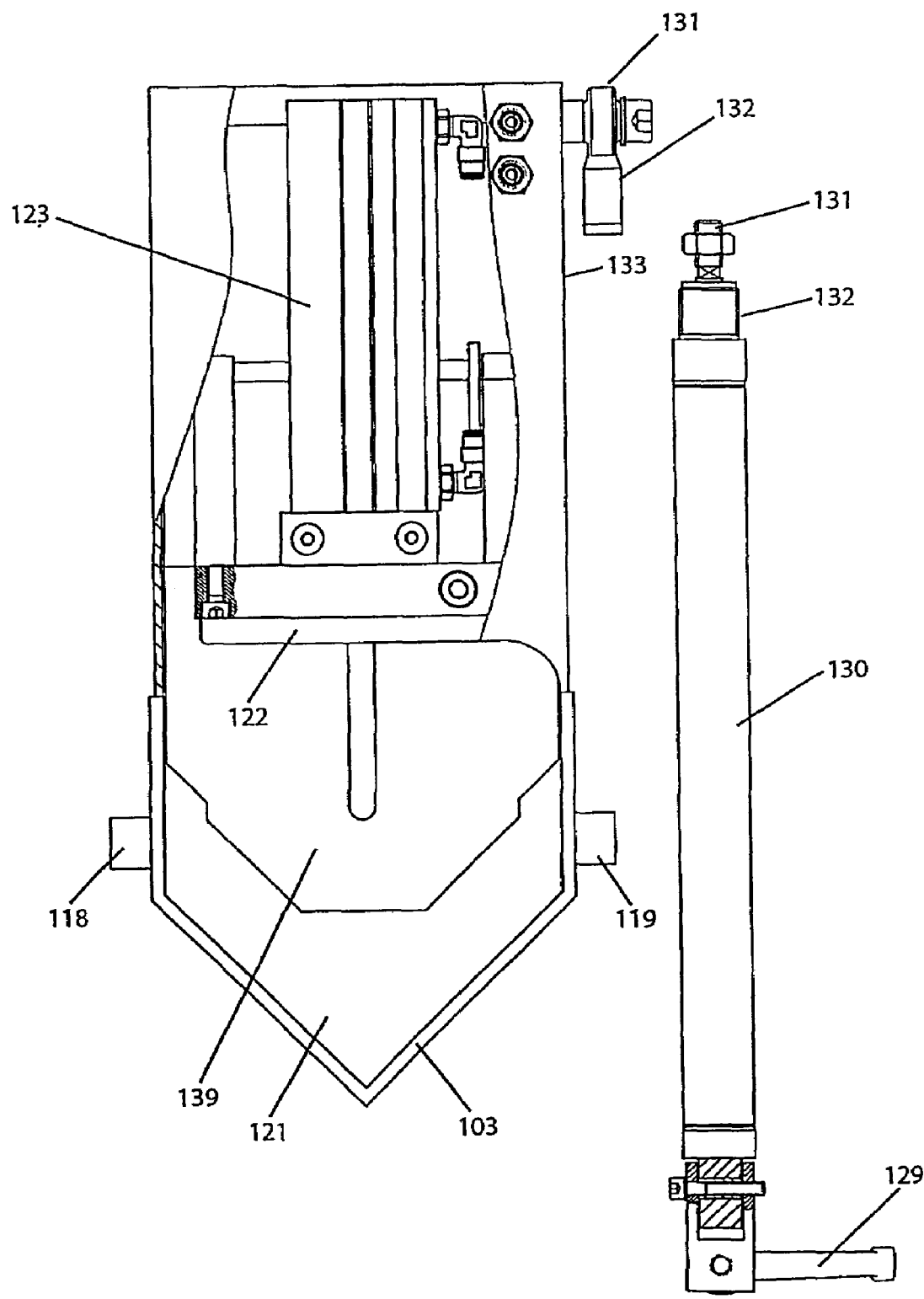
FIG. 18 is a top plan view of the tiltable table for holding the bits to be ground of the grinding apparatus of FIG. 12.
Figure 19:
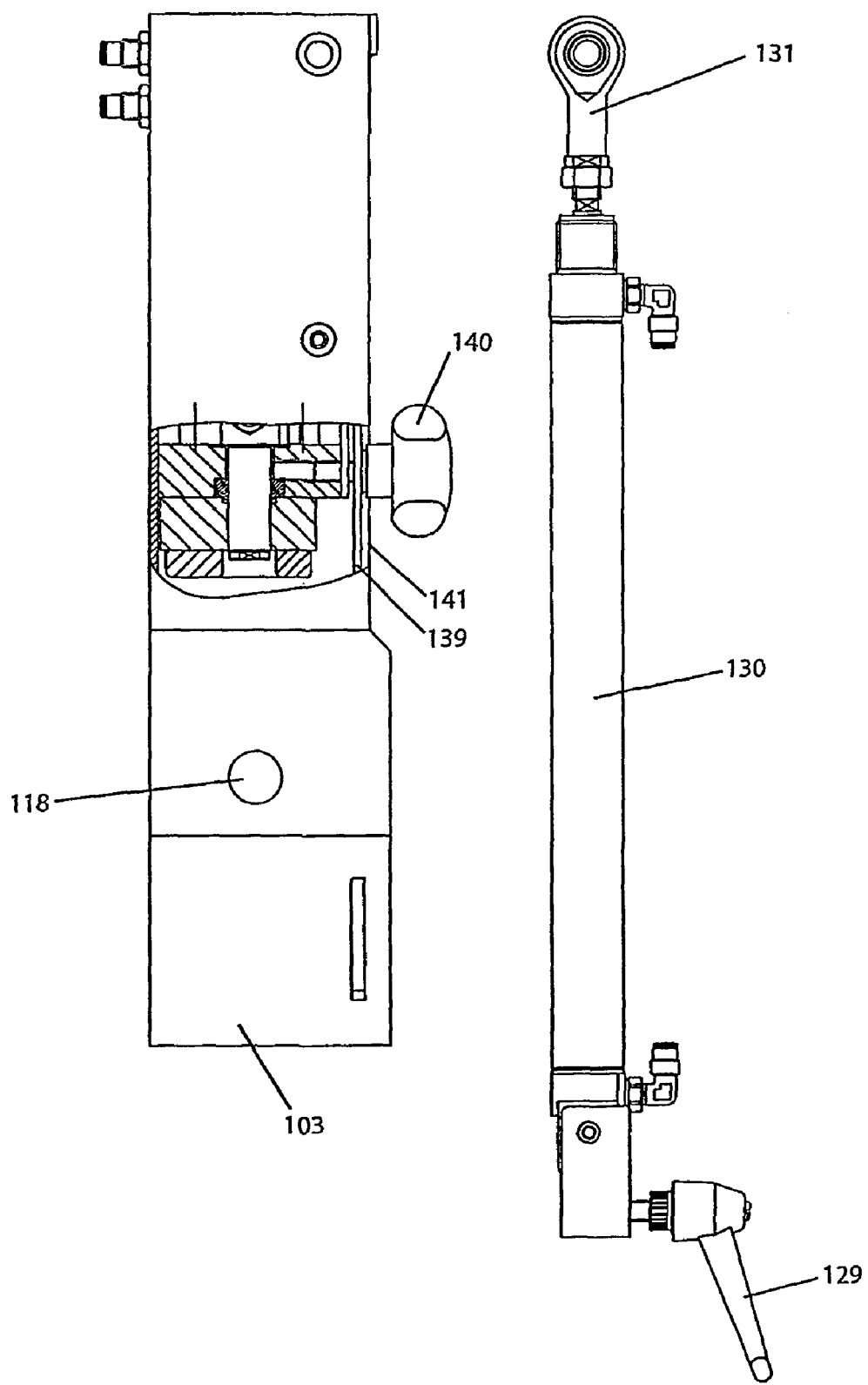
FIG. 19 is a right side plan view of the table of FIG. 18.
Figure 20:
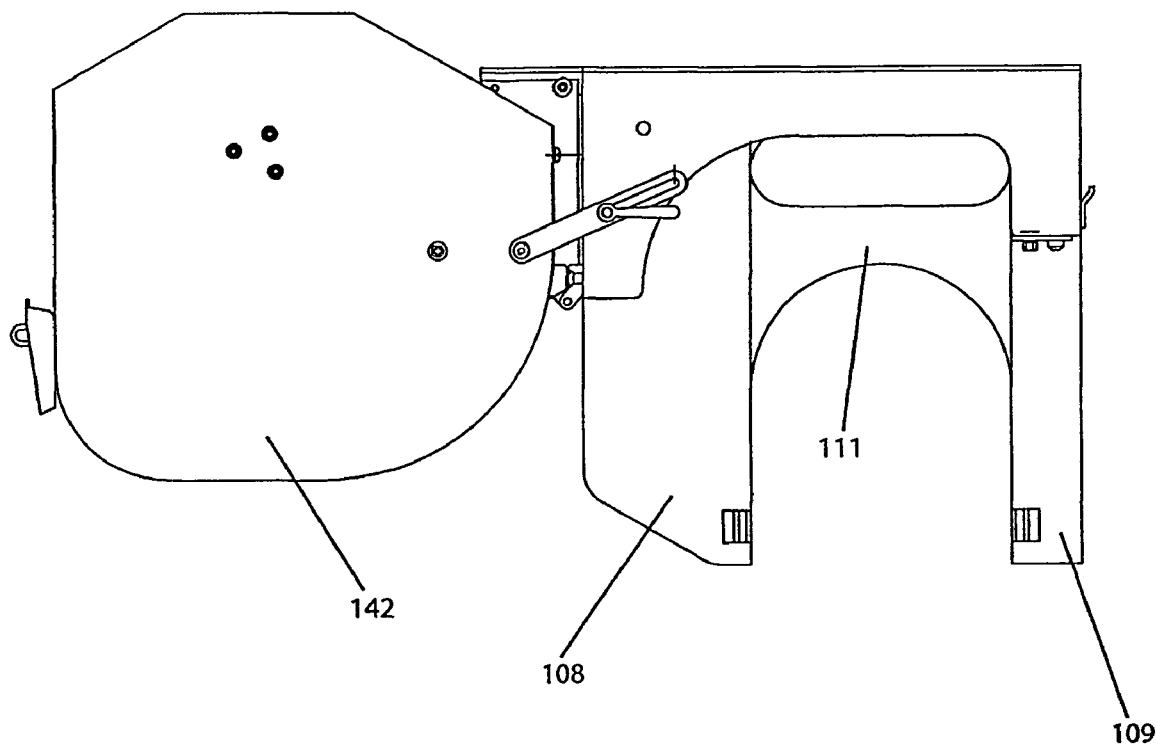
FIG. 20 is a plan view of bottom of the frame of FIG. 13.

In order to minimize operator set up and movement of the bit during regrinding, table 103 is tiltably mounted to the frame 102 at pivot points 118, 119 on the appropriate places of the extending arms 108, 109 (see FIG. 12 and FIG. 18). The table 103 is provided with one or more apertures 121 to hold one or more bits to be ground. A bit (not shown) is positioned in aperture 121 with the button to be ground in the vertical position. The bit is held in place by pressure plate 122 controlled by a locking cylinder 123. The locking cylinder can be backed off slightly to rotate the bit (to the next button to be ground) within the aperture 121 without full release of the pressure on the locking cylinder.

The grinding machine 113, in order to properly regrind a worn button, should be aligned with the longitudinal axis of the button. Accordingly to regrind the gauge buttons, table 103 is tilted to correspond to the angle at which the buttons are mounted in the bit. The bit is then indexed in the table so that the longitudinal axis of the button to be ground is in the vertical. The means of tilting table 103 is best illustrated with reference to FIGS. 18 and 19. The front edge 124 of right side 107 is bent to form an inwardly extending flange 125. A longitudinal slot 126 is provided in flange 125. A scale 127 is preferably provided to indicate the angle at which the table 103 will be tilted. A stop 128 is positioned within the slot 126 at the desired angle and locked in place by lever 129. Once set for a particular bit type, the angle is fixed and doesn't have to be reset for each bit or button to be reground. A cylinder 130 is connected to stop 128 and the end 131 of the cylinder rod 132 is connected to the side 133 of table 103 at point 134. When air is fed to cylinder 130, retraction of the rod 132 will tilt table 103 until the rod is fully retracted. As shown in FIG. 12, controls, generally indicated at 135, for tilting the table and locking the bit(s) in place are provided on the instrumentation panel 136 on the hinged protective cover 112. One switch 137 controls the cylinder 130 for tilting the table 103 and a second switch 138 controls the looking cylinder 123 and pressure plate 122. Flow controls are provided to regulate the speed of movement of the table and the pressure plate.

Large down the hole bits to be reground typically have a relatively long shaft that fits through aperture 121. In order to regrind smaller bits a floor plate 139 that can be slid in and out of position under aperture 121 is provided. Knob 140 and slot 141 in table 103 control the location of the floor plate 139. Adapters for holding multiple small sized bits can be inserted into aperture 121. Use of the adapters eliminates repetitive set up time for the operator.

A splashguard 142 (see FIG. 20) connected to bottom plate 111 of frame 102 is provided at the front of the grinding machine 113 that can be raised and lowered.

Figure 16:
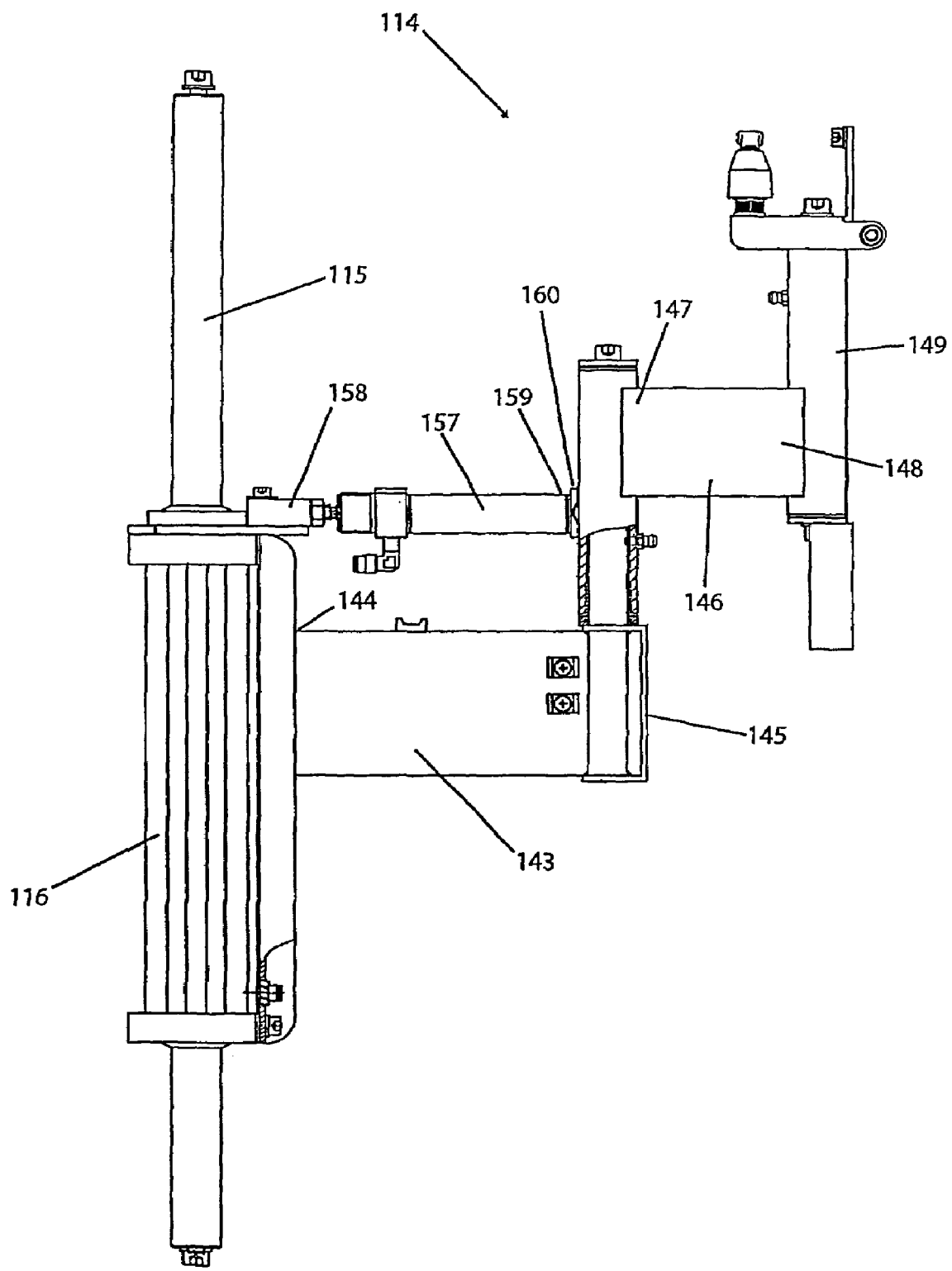
FIG. 16 is a front plan view of the arm or lever system of FIG. 12.
Figure 17:
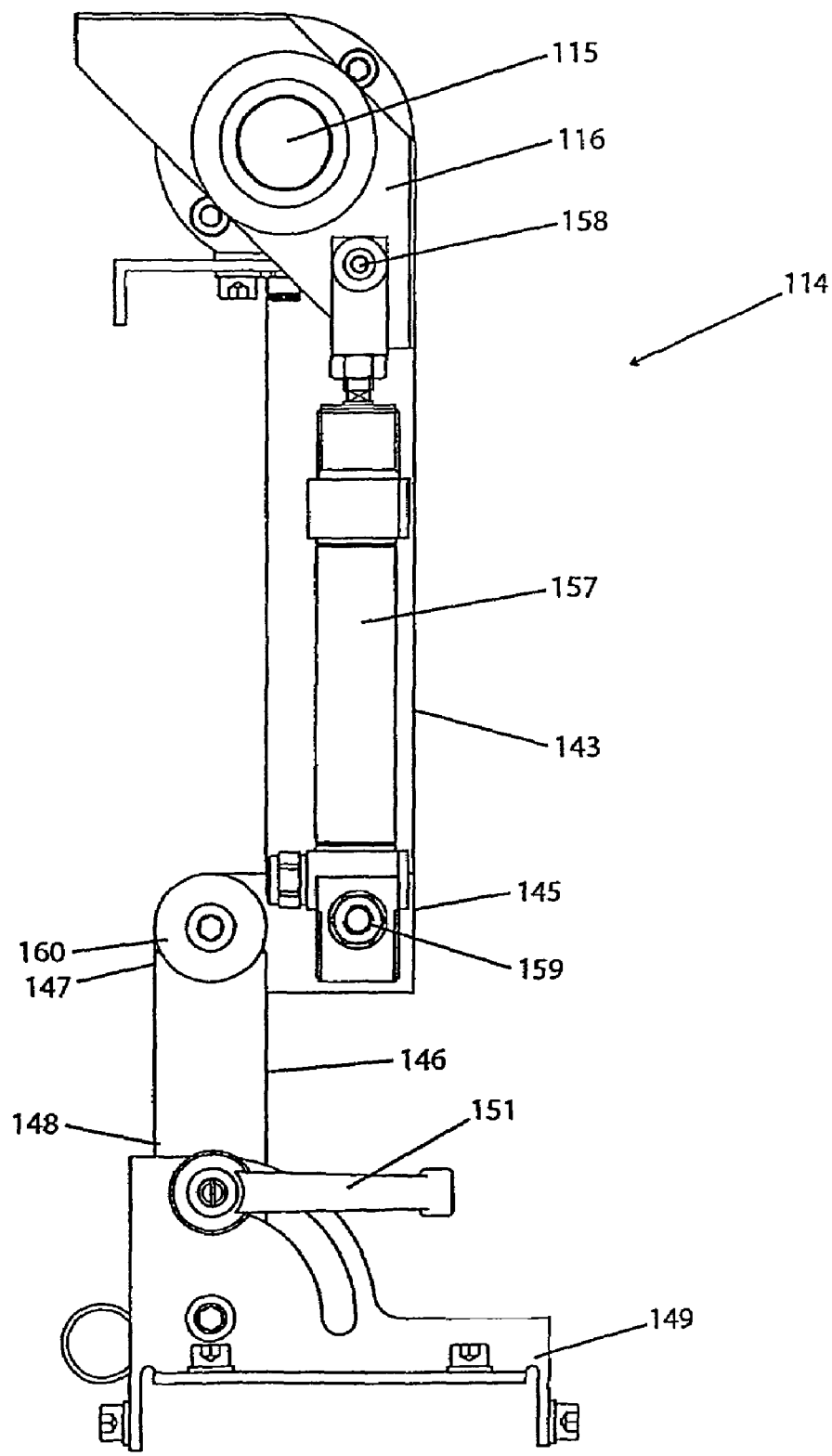
FIG. 17 is a top plan view of the arm or lever system of FIG. 16.

The arm system 114 for carrying and positioning grinding machine 113 as noted previously is journaled onto cylinder rod 115. With reference to FIGS. 12 and 16, the arm system 114 consists of a first arm section 143 having one end 144 journaled to cylinder rod 115. The other end 145 of the first arm section 143 provides the mount for the second arm section 146. One end 147 of the second arm section 146 is journaled to the first arm section 143. The other end 148 of the second arm section 146 is journaled to the back mount 149 connected to control box 150. Locking lever 151 allows control box 150, with back mount 149 to be moved into position in relation to the axis of the second arm section and then to be locked. Cylinder 116 through cylinder rod 115 controls the vertical movement of the grinding machine up and down. Cylinder 116 through cylinder rod 115 provides a balance pressure to the arm system when the grinding machine 113 is not in use and grinding pressure/feed when in use. The grinding balance pressure and pressure/feed can be adjusted.

Within the second control box 150, is a rotation motor 152 and bearing arrangement 153 for providing an orbital rotation to grinding machine 113. The grinding machine 113 is attached to control box 150 by means of plates 154. The grinding machine 113 has an electric motor in the embodiment shown but can also utilize other motor type such as air or hydraulic motor. Each of the plates 154 is provided with an arcuate slot 155. The angle of attachment of the grinding machine 113 relative to control box 150 can be adjusted by means of slots 154 and locking lever 156. By having the grinding machine oscillate slightly off vertical, nipple formation on the button being reground is minimized and uneven wear on the grinding cup avoided.

When grinding buttons, the self-centering aspects of the grinding machine tend to center the grinding machine over the highest point on the button. On buttons where wear is uneven, typically gauge buttons, this may result in regrinding the button off center from its vertical axis. To substantially align the grinding machine with the longitudinal axis of the button, the second arm section 146 is provided with a cylinder 157 having one end 158 connected to the cylinder 116 and the other end 159 connected to the mount 160 of the second arm section 146. The cylinder 157 provides a biased load to grinding machine 113 to help align the grinding machine over the button. In the embodiment shown, the cylinder 157 is automatically activated when the table is tilted by the pilot feed from cylinder 130 through valve 161 in instrumentation panel 136. The biased load causes the grinding machine to grind more on the inside or outside of the gauge buttons, as required, thereby tending to shift the grinding machine over the true center of the button. The suitable biased load can be provided by other means such as counter weights, etc. Another method of aligning the grinding machine with the longitudinal axis of the button, in cases where deemed necessary, is by using one or more cylinder(s) 157 connected to cylinder 116 and cylinder rod 115 or frame 102 to lock the position of grinding machine 113 in the plane normal to and aligned with the longitudinal axis of the button to be ground. Additionally or alternatively cylinders, mechanical locks etc. can be incorporated to achieve the desired effect. During grinding the grinding machine will then grind the button in alignment with the button axis. Other methods such as mechanical locks can also be used for locking the horizontal distance or position in the horizontal plane of grinding machine 113 from, for example, cylinder 116 and cylinder rod 115 or frame 102.

Variations of the above described principle of biased side loads, counter balancing and position fixing, that can be used to allow for grinding at angles other than vertical, are within the scope of the present invention. Combinations of variations of the above described principle of biased side loads, counter balancing and position fixing can be used to substantially eliminate the need for tilting/pivoting the bit when switching between grinding of face buttons and gauge buttons. This principle would be ideal in cases where tilting or pivoting of the bit is difficult due to size, weight, etc.

Having illustrated and described a preferred embodiment of the invention and certain possible modifications thereto, it should be apparent to those of ordinary skill in the art that the invention permits of further modification in arrangement and detail.

It will be appreciated that the above description related to the preferred embodiment by way of example only. Many variations on the invention will be obvious to those knowledgeable in the field, and such obvious variations are within the scope of the invention as described and claimed, whether or not expressly described.

The embodiments of the invention in which an exclusive property or privilege is claimed are defined as follows:

1. A grinding apparatus for grinding buttons of drill bits, tunnel boring machine cutters and raised bore machine cutters, said grinding apparatus having means for holding one or more drill bits, tunnel boring cutters and raised bore machine cutters to be ground and a self centering grinding machine carried by a support system that permits movement of the grinding machine horizontally and vertically to align the grinding machine about a longitudinal axis of the button to be ground wherein biasing means are provided on said support system for providing a biased side load to the grinding machine during grinding and substantially perpendicular to the longitudinal axis of the button to be ground to maintain alignment of the grinding machine with the longitudinal axis of the button to be ground.

2. A grinding apparatus according to claim 1 wherein the means for holding one or more bits to be ground includes a table with one or more apertures to hold one or more bits to be ground, said table tiltably mounted within a box or frame and means to control the tilting action of said table.

3. A grinding apparatus according to claim 2 wherein the means to control the tilting action of the table consists of an arced slot provided in a side of the box, a moveable stop within the slot that can be positioned and locked in place at the desired angle and a cylinder provided on the side of the box having an end of the cylinder rod connected to the table.

4. A grinding apparatus according to claim 3 wherein means are provided to lock a bit within said aperture and means to partially release the pressure to permit the bits to be rotated without full release of the locking means.

5. A grinding apparatus according to claim 2 wherein said box is provided with an adjustable splashguard.

6. A grinding apparatus according to claim 3 wherein the cylinder providing a biased side load is automatically activated when the table is tilted.

7. A grinding apparatus according to claim 2 wherein the means for holding one or more bits to be ground includes a frame and said support system has a first arm section with a first end journaled on said frame for adjustment of said grinding machine normal to the longitudinal axis of the button to be ground and wherein the means for providing a biased side load to said grinding machine consists of a cylinder having one end connected to said frame and the other end connected to said first arm section.

8. A grinding apparatus according to claim 7, wherein said support system includes means for providing a balance pressure when the grinding machine is not in use and grinding pressure when in use.

9. A grinding apparatus according to claim 8 wherein said support system includes a second arm section.

10. A grinding apparatus according to claim 9 wherein the means for providing a balance pressure includes a cylinder connected to the second arm section.

11. A grinding apparatus according to claim 10, wherein said second arm section has an upper and lower parallel arm with a first end of each arm pivotally mounted to a front side of a first control box, a second end of each arm is pivotally connected to a back side of a second control box wherein the means for providing a balance pressure to said second arm section includes a cylinder connected to the first end of the lower arm, said first end of said lower arm extending out from a pivot point at which the lower arm is connected to the first control box.

12. A grinding apparatus according to claim 8 wherein the means to control the tilting action of the table consists of an arced slot provided in a side of the box, a moveable stop within the slot that can be positioned and locked in place at the desired angle and a cylinder provided on the side of the box having an end of the cylinder rod connected to the table.

13. A grinding apparatus according to claim 12 wherein means are provided to lock a bit within said aperture and means to partially release the pressure to permit the bits to be rotated without full release of the locking means.

14. Grinding apparatus according to claim 12 wherein the cylinder providing a biased side load is automatically activated when the table is tilted.

15. A grinding apparatus according to claim 1 wherein the biasing means provide a controlled biased side load to the grinding machine during grinding.

16. A grinding apparatus according to claim 15 wherein the biasing means provide a controlled biased side load to the grinding machine during grinding of buttons exhibiting uneven wear.

17. A grinding apparatus according to claim 16 wherein the means for holding one or more bits to be ground includes a frame and said support system has a first arm section with a first end journaled on said frame for adjustment of said grinding machine normal to the longitudinal axis of the button to be ground and wherein the means for providing a biased side load to said grinding machine consists of a cylinder having one end connected to said frame and the other end connected to said first arm section.

18. A grinding apparatus according to claim 17, wherein said support system includes means for providing a balance pressure when the grinding machine is not in use and grinding pressure when in use.

19. A grinding apparatus according to claim 18 wherein the biasing means providing a biased side load to the grinding machine during grinding is independent from the means for providing a grinding pressure when in use.

20. A grinding apparatus according to claim 19 wherein said support system includes a second arm section.

21. A grinding apparatus according to claim 20 wherein the means for providing a balance pressure includes a cylinder connected to the second arm section.

22. A grinding apparatus according to claim 21, wherein said second arm section has an upper and lower parallel arm with a first end of each arm pivotally mounted to a front side of a first control box, a second end of each arm is pivotally connected to a back side of a second control box wherein the means for providing a balance pressure to said second arm section includes a cylinder connected to the first end of the lower arm said first end of said lower arm extending out from a pivot point at which the lower arm is connected to the first control box.

23. A grinding apparatus according to claim 17 wherein said support system includes a second arm section.

24. A grinding apparatus for grinding buttons of drill bits, tunnel boring machine cutters and raised bore machine cutters, said grinding apparatus having means for holding one or more drill bits, tunnel boring cutters and raised bore machine cutters to be ground and a self centering grinding machine carried by a support system mounted on a frame that permits movement of the grinding machine horizontally and vertically to align the grinding machine about a longitudinal axis of the button to be ground wherein biasing means are provided for providing a biased side load to the support system relative to the frame such that a biasing force is imparted to the grinding machine during grinding and wherein the biased side load is substantially perpendicular to the longitudinal axis of the button to be ground to maintain alignment of the grinding machine with the longitudinal axis of the button to be ground.

* * * * *